United States Patent [19]

Poncet

[11] Patent Number: 4,533,313
[45] Date of Patent: Aug. 6, 1985

[54] PRESS WITH COLUMNS COMPENSATED FOR DEFORMATION DURING TIGHTENING

[76] Inventor: Pierre Poncet, 12 bis Rue Trarieux, 69003 Lyon, France

[21] Appl. No.: 592,310

[22] Filed: Jun. 22, 1984

[51] Int. Cl.³ .............................................. B29F 1/06
[52] U.S. Cl. ................... 425/451.2; 425/590; 425/406
[58] Field of Search ............. 425/590, 595, 450.1, 425/451.2, 451.9, 406

[56] References Cited

U.S. PATENT DOCUMENTS

| | | | |
|---|---|---|---|
| 3,433,290 | 3/1969 | Eggenberger et al. | 425/590 X |
| 3,570,060 | 3/1971 | Stephenson | 425/406 X |
| 3,613,171 | 10/1971 | Hehl | 425/451.2 |
| 3,669,599 | 6/1972 | Snider et al. | 425/451.2 X |
| 3,830,613 | 8/1974 | Aoki | 425/450.1 X |
| 3,905,741 | 9/1975 | Poncet | 425/590 X |
| 4,021,181 | 5/1977 | Hehl | 425/450.1 |
| 4,106,885 | 8/1978 | Poncet | 425/450.1 |
| 4,304,540 | 12/1981 | Hammon | 425/451.2 X |

FOREIGN PATENT DOCUMENTS

| | | |
|---|---|---|
| 1703297 | 4/1968 | Fed. Rep. of Germany . |
| 2431585 | 7/1974 | Fed. Rep. of Germany . |
| 1200920 | 7/1958 | France . |

*Primary Examiner*—J. Howard Flint, Jr.
*Attorney, Agent, or Firm*—Dowell & Dowell

[57] ABSTRACT

Each column of a press comprises a core rod 2 slidably surrounded by a sleeve 3. The tightening jack 10 associated with the column in question acts on the mobile plate 8 to tighten the mould 11, 12. The upper plate 4 transmits the reaction to the auxiliary jack 5-6 which, bearing on the core 2, applies to the plate 4 a force equal to that developed by the auxiliary jack. In this way the sleeve is theoretically subjected to no effort. The jacks 9, 10 and 5-6 may be supplied in parallel. If the tightening jack 9-10 is not coaxial to the column, one may be content with an approximate solution, or one may use as auxiliary jack a multiple jack in tandem, suitably supplied, or the deformations of the sleeve may be detected and the auxiliary jack controlled so that it cancels them.

6 Claims, 6 Drawing Figures

PRESS WITH COLUMNS COMPENSATED FOR DEFORMATION DURING TIGHTENING

The present invention relates to presses in general and more particularly to those for moulding plastics materials by compression or by injection.

These presses comprise in principle two plates of which one is fixed and the other mobile to ensure tightening of the two halves of the mould. It is essential that, during this tightening, the two plates remain perfectly parallel to each other. Now, the columns which connect the fixed plate to the bearing devices of the mobile plate extend elastically under the effect of the forces coming into play and as, in general, the mould impression is not symmetrical, these forces are different for the various columns, the parallelism ensured at rest tends to disappear. The presses must therefore be equipped with columns of exaggerated section for their elongation to remain negligible. This solution is expensive and imperfect, particularly for high-power machines and machines of large dimensions.

French Pat. No. 2 204 490 describes a press with columns each constituted by a central core and by a sleeve slidably surrounding the latter, an auxiliary jack pre-stressing the core in traction and the sleeve in compression under a fixed load substantially equal to the maximum load provided for the column in question. However, this solution supposed that the sleeve was virtually incompressible, therefore, there again, of very large section and consequently cumbersome and expensive.

According to the present invention, in a press comprising columns of which each is thus constituted by a central core slidably surrounded by a sleeve, whilst an auxiliary jack is disposed between these two members for pre-stressing the core in traction and the sleeve in compression, this jack is controlled by the hydraulic tightening pressure so as to impose on the sleeve a pre-stress of compression equal or at least approximately equal to the force of traction applied to the core of the column, so as to eliminate, or at least reduce to a large extent, the deformations of the sleeve during tightening of the press.

If the jacks for tightening the press are coaxial to the columns, it obviously suffices that each auxiliary jack has the same section as the corresponding tightening jack and is supplied in parallel therewith. The solution is then perfect.

In the case of tightening jacks non-coaxial to the columns, if they are in a number equal to that of the columns and if there exists for each of them such a jack relatively close thereto, it may also be provided to connect this jack and the auxiliary jack corresponding to the column in question, in parallel. The solution is not perfect, but it may be sufficient in many cases.

The load imposed on each column may also be determined algebraically and the auxiliary jacks may be provided accordingly. This solution is also perfect, but it obliges the auxiliary jacks to be produced in multiple form with elements in tandem.

Finally, it is possible to associate with each sleeve a deformation detector and a hydraulic valve which controls the auxiliary jack so that it causes the deformation thus detected to disappear. There again, the solution is theoretically perfect.

The accompanying drawing, given by way of example, will enable the invention, the characteristics that it presents and the advantages that it is capable of procuring, to be more readily understood.

Figure 1:
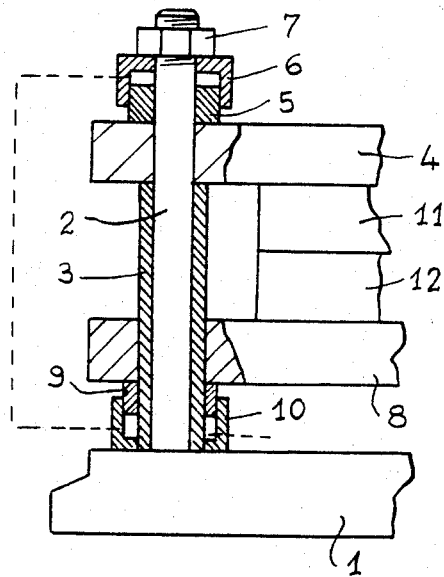
FIG. 1 is a partial vertical section showing one of the corners of a press equipped with auxiliary jacks according to a first embodiment of the invention.

The press of which a corner has been very schematically shown in FIG. 1, comprises a base 1 on which are mounted columns, generally four in number, each comprising a core 2, slidably surrounded by a sleeve 3 from which it projects upwardly to receive a fixed upper plate 4. On this plate 4 bears the piston 5 of an annular auxiliary jack with very short stroke of which the cylinder 6 abuts against a retaining nut 7 screwed on the core 2. On the lower part of the sleeve 3 may slide a mobile lower plate 8 actuated by a likewise annular tightening jack, comprising a piston 9 which bears against the plate 8 and a cylinder fast with said sleeve.

The two jacks 5-6 and 9-10 have the same section and are connected in parallel.

The two halves 11 and 12 of the mould are tightened between the two plates 4 and 8.

It will be understood that during tightening the upward thrust exerted by jack 9-10 is transmitted to the fixed plate 4, which receives from the auxiliary jack 5-6 a downward thrust of exactly equal value. These two thrusts cancel each other out and consequently the sleeve 3 is not loaded and does not contract. The plate 4 therefore always remains in the same position with respect to the base 1. The tightening force is finally supported by the cores of columns 2, which may extend without this influencing the position of the plate 4.

However, in order to take tolerances, frictions and possible operational mishaps into account, care is taken to fix the sleeve 3 solidly to the base 1 and to the fixed plate 4.

Figure 2:
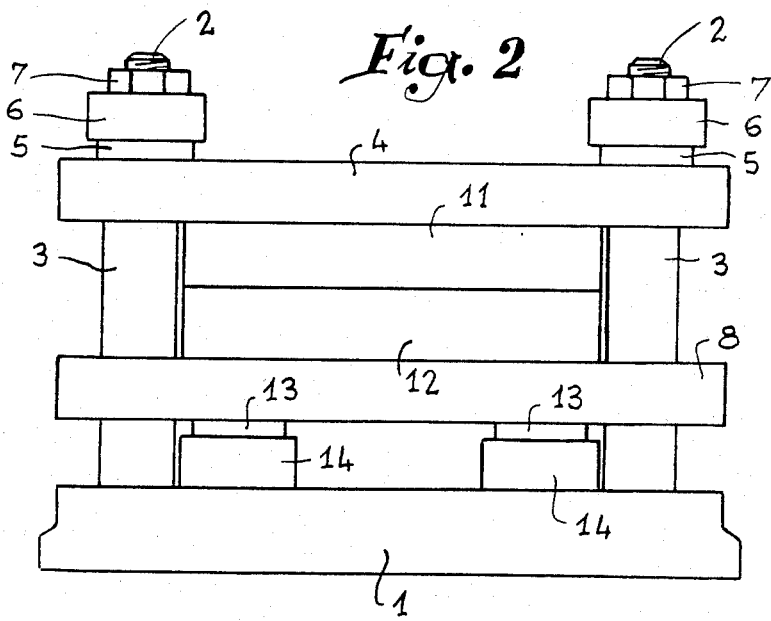
FIG. 2 is a view in elevation of another embodiment.
Figure 3:
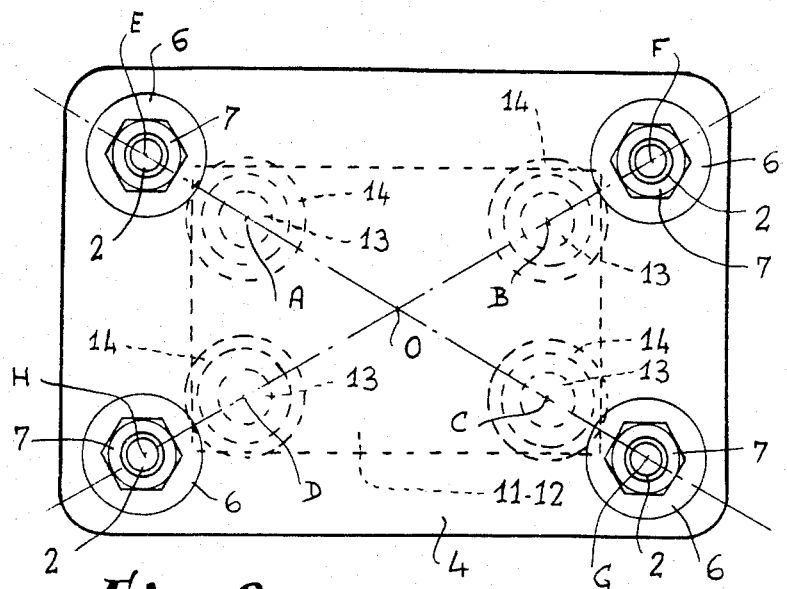
FIG. 3 is a plan view corresponding to FIG. 2.

In the embodiment of FIGS. 2 and 3, the four tightening jacks, here referenced 13-14, are not coaxial to the columns 2-3. This results in that the irregularities of the efforts developed by these jacks at points A, B, C, D of the plan view of FIG. 3 determine moments which are not perfectly balanced by those resulting from the forces that the auxiliary jacks exert at E, F, G and H. However, if the impression of the mould is not too asymmetrical and if the distances AE, BF, CG and DH are not too great, compensation of the efforts is ensured to a sufficient extent for the longitudinal deformations (contraction or extension) of the sleeves 3 to remain negligible.

Knowing, moreover, the positions of the eight points A to H, the efforts that the auxiliary jacks 5-6 must exert may be determined algebraically, but for each of them the effort in question is the sum of several factors, which then obliges it to be made in the form of a plurality of elements in tandem.

Figure 4:
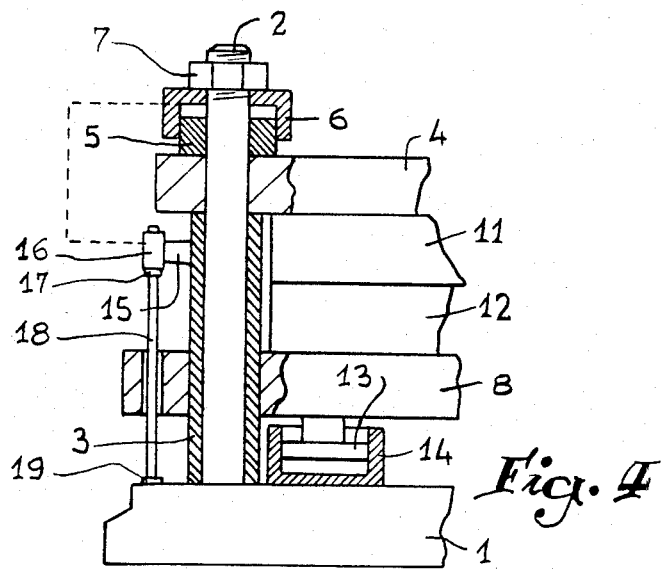
FIG. 4 is a partial section similar to that of FIG. 1, but concerning a third embodiment.

FIG. 4 indicates another type of solution applicable to all cases and which does not require the use of auxiliary jacks with multiple elements. Here, towards the upper end of each sleeve 3 there has been fixed to the latter by a lateral arm 15 the outer body 16 of a highprecision hydraulic three-way valve, whilst the corresponding inner slide 17 is fixed to a vertical rod 18 of which the lower end is in turn fixed to the base 1 at 19. It will be understood that, under these conditions, the system 16-18 detects the beginning of the deformations of the sleeves 3 and corrects them immediately, whatever the number and positions of the tightening jacks such as 12-13.

Figure 5:
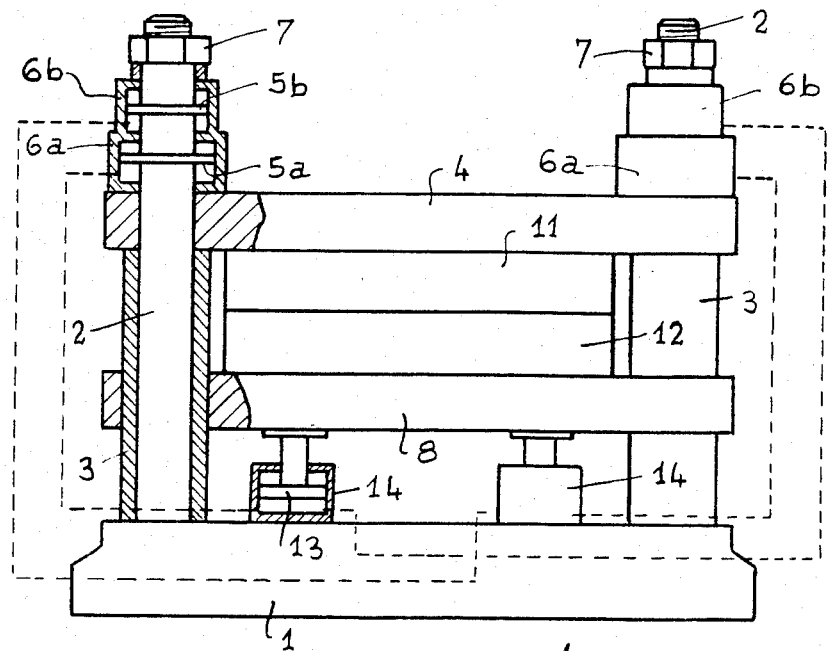
FIG. 5 is a view in elevation with partial section of a press in which the tightening jacks are in longitudinal alignment of the columns, the auxiliary jacks being made in the form of two elements in tandem.
Figure 6:
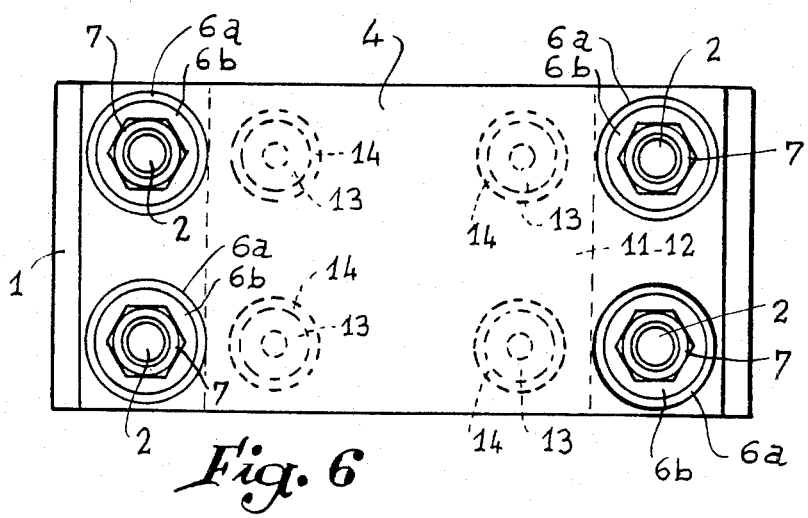
FIG. 6 is the plan view corresponding to FIG. 5.

FIGS. 5 and 6 correspond to the case of a press whose profile is in the form of an elongated rectangle in which the four tightening jacks 13-14 are disposed in longitudinal alignment with the four columns 2-3. It is easy to demonstrate algebraically that, here, the efforts that each auxiliary jack must develop are a function of two factors only, namely the forces exerted by the two tightening jacks 13-14 located on the same longitudinal line. Each of these auxiliary jacks may therefore be established in the form of two elements in tandem 5a-6a, 5b-6b of appropriate sections, connected in parallel, one to the tightening jack 13-14 nearest in the longitudinal direction, the other to the jack most remote in this same direction. Here again, a theoretically perfect solution is produced, without exaggerated complications.

It will be noted that, in FIGS. 5 and 6, all the jacks (tightening jacks and auxiliary jacks) have been shown as being double-acting, whilst in FIGS. 1 to 4, it had been supposed, for simplification, that they were only single-acting. It is obvious for any technician that, in practice, it is the double-acting embodiment which should be adopted at least for the tightening jacks.

Of course, the press may comprise any appropriate device of approach jacks. The mobile plate 8, which has been supposed to be the lower one, may, on the contrary, be the upper plate, in which case the piece referenced 4 in the accompanying drawings would be a fixed bearing plate for a mobile plate which would be connected thereto by the tightening jacks such as 13-14. The detector and corrector system 16-17 of FIG. 4 may comprise a multiplier mechanism with levers or the like in order to increase the sensitivity thereof. Columns 2-3 may be horizontal. Furthermore, the invention is applicable not only to presses intended for moulding, but also to all the others which raise similar problems.

I claim:

1. Press comprising columns of which each is constituted by a central core slidably surrounded by a sleeve, whilst an auxiliary jack is disposed between these two members for pre-stressing the core in traction and the sleeve in compression, characterized in that this auxiliary jack is controlled by the hydraulic tightening pressure so as to impose on the sleeve a pre-stress of compression equal or at least approximately equal to the force of traction imposed on the core of the column, so as to eliminate, or at least reduce to a large extent, the deformations of the sleeve during tightening of the press.

2. Press according to claim 1, in which the tightening jacks are coaxial to the columns, characterized in that each auxiliary jack is of section substantially equal to that of the tightening jack corresponding to the same column and is supplied in parallel therewith.

3. Press according to claim 1, in which the tightening jacks are in a number equal to that of the columns, each of them being disposed relatively close to one of them, characterized in that each auxiliary jack has the same section as the tightening jack adjacent the corresponding column and is supplied in parallel therewith.

4. Press according to claim 1, characterized in that with each sleeve are associated a detector sensitive to the deformations thereof under the effect of the hydraulic tightening pressure of the press, and a hydraulic valve controlled by this detector, this valve being connected to the auxiliary jack corresponding to this sleeve so as to control it in such a manner that it opposes the deformation detected by the detector.

5. Press according to claim 4, characterized in that the detector and the hydraulic valve are combined in the form of a slide valve of which one of the constituent parts (body and inner slide) is fixed to the end of the sleeve which receives the tightening reaction and the other to a rod parallel to the column and itself fixed to the other end of this sleeve.

6. Press according to claim 1, with a rectangular profile in plan view, in which the four tightening jacks are disposed in two's in longitudinal alignment with the four columns, characterized in that each auxiliary jack is made in the form of two elements in tandem, each element, provided to be of appropriate section, being connected in parallel, the first to the tightening jack adjacent in the longitudinal direction, the second to the jack most remote in this same direction.

* * * * *